E. Hall,
Metal Drill.
Nº 1,305. Patented Aug. 29, 1839.
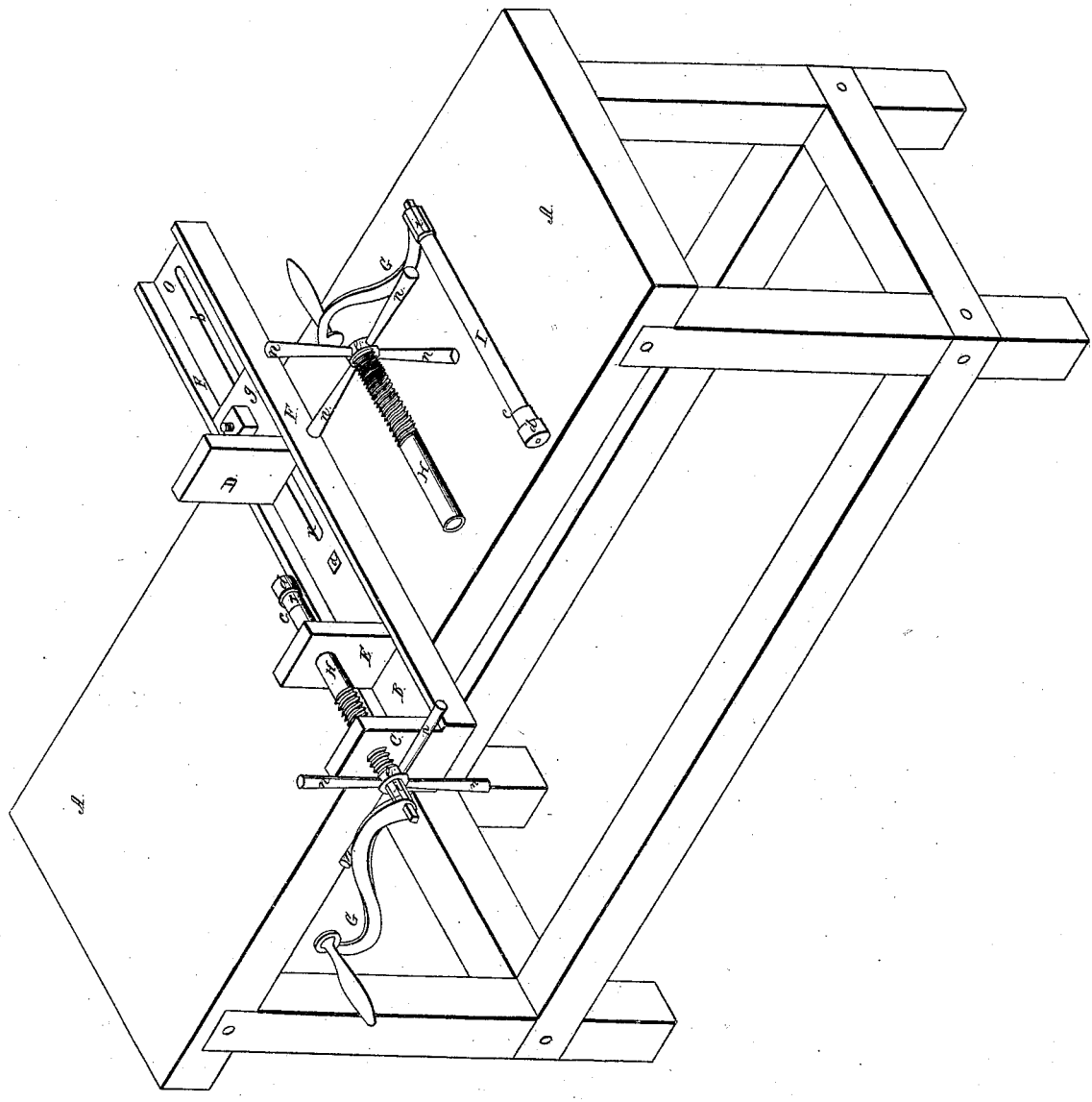

UNITED STATES PATENT OFFICE.

ELISHA HALL, OF BYRON, NEW YORK.

MACHINE FOR DRILLING METALLIC AND OTHER SUBSTANCES.

Specification of Letters Patent No. 1,305, dated August 29, 1839.

*To all whom it may concern:*

Be it known that I, ELISHA HALL, of Byron, in the county of Genesee and State of New York, have invented a new and Improved Machine for Drilling Metallic and other Substances; and I do hereby declare that the following is a full and exact description.

The nature of my invention consists in providing at a small expense a simple and convenient apparatus for boring and drilling, so constructed as to render its application simple, easy, and convenient and to adapt it to the various wants of mechanics and workmen and supply the place in many instances of various other expensive, complicated and imperfect machines now in use for drilling metallic and other substances. This apparatus being simple in its component parts and occupying but little space, may be set up in any smith's or other mechanic's shop, and conveniently used by hand; or, if need be, by the application of any of the various motive agents, as of water, steam, horse power, &c.

To enable others skilled in the construction of machinery to make and use my invention I will proceed to describe its construction and operation.

In the plan which accompanies this specification and to which reference is herein made A A is a work bench of any suitable dimensions, (but which as shown on said plan, is five feet long by twenty inches wide,) on which the drilling machine is located, either transversely as shown on said plan, or longitudinally from one end of said bench; and to which it is secured or fastened by wrought iron bolts running vertically through the bottom of the machine and the bench, having a head on their upper end which is countersunk into the upper surface of the bottom of said machine, and a screw and nut on their lower end, on under side of said workbench; the head on upper end of one of said bolts is shown on the plan at *a*; or the machine may be fastened to said bench in any other convenient way, as deemed most expedient.

B, O, F, F, is a cast iron trough three feet long, five inches wide externally, and four inches inside width, and one inch deep, having its sides F, F, each rectangular, half an inch thick laterally, and one inch high vertically, above and resting on the bottom B O, which is one inch thick and five inches wide from outside to outside, having a slit *b b* made vertically through its middle half an inch wide and one foot nine inches long, commencing one inch from the end O of said trough.

C and E are rectangular supports of equal dimensions rising perpendicularly from and resting on the bottom of the said trough, the support C being in the end B of the trough, and E six inches from it toward the end O; each of these supports is six inches high perpendicularly above the bottom B O on which they stand, and four inches wide laterally, so as just to fill the inside width of said trough, and one inch thick in the direction from B to O, and each of these supports is perforated in the direction from B to O in their middle, at two inches from the top by a round hole one and one fourth inches diameter—The hole through E being made smooth forms the gudgeon box in which the cylinder H rests and revolves; and the hole through C is formed into a female screw to fit and receive the screw on the outward surface of the said cylinder H, and receives and supports the end *c* of said cylinder.

The frame work of the machine as described thus far, that is the trough B O, F, F, and the supports C and E, is made of cast iron, and is cast together whole so as to form but one piece of casting.

D is a wrought iron knee having its horizontal and its vertical parts of equal dimensions, and their planes turned at right angles to each other: the upright point serves as a rest against which the substance to be drilled is held, either by hand or in any other convenient way according to the shape, size, or nature of the substance; and the horizontal part *g* forms its base and sets in the bottom of said trough, and may slide toward B or O so as to adjust the substance to be drilled to the point of the drill. The horizontal part is perforated vertically in its middle by a round hole half an inch in diameter, which is directly above the slit *b b* above described; through the slit *b b* and said hole in the horizontal part of the knee D a half inch wrought iron bolt is passed, having a head on its lower end under the bottom of said trough, and having its lower part which passes through the said slit *b b* made square so as to prevent its turning in said slit, and its upper part which passes through the horizontal part *g*, round and terminating in a screw which receives an iron nut above the upper side of the horizontal part *g*, which serves, when the rest D is adjusted to the point of the drill by moving it either backward or forward, to fasten it and render it immovable. The upright and the horizontal parts of this knee are each one inch thick, six inches long, and four inches wide so as to just fill the width of the trough.

H is a hollow cylinder twelve inches long made of wrought iron, well case hardened to prevent the effects of friction; the rim of this cylinder is one eighth of an inch thick, its external diameter one and one fourth inches, and its internal diameter or the diameter of its bore or hollow is one inch. One inch in length of this cylinder at one end is made one and one half inches in diameter as shown at *c;* and to this part *e* four wrought iron levers each six inches long are attached and radiate from it as seen on the plan at *m, m, m, m,* to the outer extremity of which levers may be attached a circular iron rim so as to form a wheel for turning the screw, but which is not however, shown on the plan. From this part *e* of said cylinder its external surface for six inches in length is formed into a male screw by having a thread raised on its surface so as exactly to fit the female screw in the support *c* above described; this screw is turned by the levers *m, m, m, m,* and its office is to feed or force the drill into and withdraw it from the substance drilled.

I is a cast steel cylinder or mandrel which is about eighteen inches long in its whole length; into one end of which the drill is inserted in the usual way as at *d*. This end *d* of said mandrel for one inch of its length is one and a half inches in diameter;—from this part the next inch of its length is one and one fourth inches in diameter and terminates in a square or vertical shoulder one eighth of an inch deep, or just equal to the thickness of the rim of the cylinder H; this shoulder is seen at *c;* and the next twelve inches of its length, or as much of its length as will equal the length of the cylinder H is one inch in diameter, and is to be made perfectly straight and round, as it is to revolve in the hollow cylinder H; the next three inches of its length or as much as may be necessary is made square to fit into the socket *i* on the end of the crank or lever G; and the remainder of its length terminates in a screw to receive an iron nut on the outside of the socket *i* which prevents the crank G from slipping from its place and prevents the mandrel I from slipping out of its place, or out of the cylinder H.

These two parts of the machine last described, that is, the hollow cylinder H and the mandrel or drill stock I are shown on the plan detached from the machine and lying separately on the bench at the right, as also put together and in their proper place in the machine.

To put the parts of the machine together the hollow cylinder H is first inserted through the holes above described in the supports C and E, the mandrel I is then put into the said cylinder the small end projecting out through the end *e* of the hollow cylinder, and on this end the socket *i* of the crank G is put and secured by an iron nut. It will be seen that the mandrel I is secured against slipping in its place either backward or forward, within the cylinder H, 1st, by the shoulder *c* on said mandrel as above described being against one end of said cylinder H, and 2nd by the socket *i* which when in its place forms a shoulder against the other end *e* of the said cylinder H.

To use this machine, the substance to be drilled being placed and firmly held in its proper place against the rest D, either by hand or by any other convenient method which may be thought proper, the mandrel I which carries the drill is turned on its axis by the crank G, thus turning also the drill, and at the same time the cylinder H is turned on its axis by the levers *m, m, m, m,* or wheel above described, the screw on its surface forcing, and (by means of the shoulder *c* above described which sets against the end of the cylinder H,) the mandrel I which revolves in it, forward toward D, and thus feeding or forcing the drill into the substance to be drilled while the drill is in motion, or by turning the screw in an opposite direction withdrawing the drill from the hole already drilled.

The relative dimensions of the several parts of my machine as given in the above description are supposed to be sufficient to adapt it to most useful purposes; but they may be varied so as to adapt the machine to other specific purposes.

What I claim as my invention and desire to secure by Letters Patent is—

The mode herein described of forcing in and drawing out the drill, that is to say having the drill stock embraced by a hollow cylinder with a screw cut upon its outer surface and supported at each end by a puppet in which it works, all as herein described.

ELISHA HALL.

Witnesses:
  RICHARD TEMPLE,
  JOSEPH WISE.